(12) United States Patent
Tsai

(10) Patent No.: US 8,068,172 B2
(45) Date of Patent: Nov. 29, 2011

(54) IMAGE ASPECT RATIO ADJUSTMENT SYSTEM AND METHOD

(75) Inventor: Leonard Tsai, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1260 days.

(21) Appl. No.: 11/644,393

(22) Filed: Dec. 21, 2006

(65) Prior Publication Data

US 2008/0151100 A1 Jun. 26, 2008

(51) Int. Cl.
*H04N 7/01* (2006.01)
*H04N 11/20* (2006.01)

(52) U.S. Cl. ......................... 348/445; 348/441; 348/446

(58) Field of Classification Search ........................ None
See application file for complete search history.

(56) References Cited

U.S. PATENT DOCUMENTS

| 4,651,208 A | 3/1987 | Rhodes et al. |
| 5,067,016 A * | 11/1991 | Wang ............................ 348/448 |
| 5,136,398 A | 8/1992 | Rodriguez-Cavazos et al. |
| 5,208,667 A * | 5/1993 | Saunders ....................... 348/452 |
| 5,956,091 A | 9/1999 | Drewery et al. |
| 5,978,040 A | 11/1999 | Diamant |
| 6,456,660 B1 * | 9/2002 | Yokoyama ............... 375/240.16 |
| 7,113,200 B2 | 9/2006 | Eshkoli |
| 7,612,830 B2 * | 11/2009 | Seo et al. ....................... 348/556 |
| 2003/0035482 A1 * | 2/2003 | Klompenhouwer et al. ........................ 375/240.16 |
| 2004/0101058 A1 | 5/2004 | Sasai et al. |

* cited by examiner

*Primary Examiner* — Jefferey Harold
*Assistant Examiner* — Michael Teitelbaum

(57) ABSTRACT

An image aspect ratio adjustment system comprises an adjustment module configured to adjust image content to correspond to an aspect ratio of a display device based at least in part on motion within the image content.

20 Claims, 3 Drawing Sheets

IMAGE ASPECT RATIO ADJUSTMENT SYSTEM AND METHOD

BACKGROUND

Image content is available in a variety of different aspect ratios (e.g., 4:3, 2.2:1, 2.35:1, 16:9, etc.). Additionally, televisions, computer monitors, and other types of image display devices are available with different screen aspect ratios or sizes. Accordingly, image content having an aspect ratio different than that of the display device screen is generally modified and/or adjusted in an attempt to fill the screen with the image content. For example, image content may be stretched, zoomed, or cropped in an attempt to fill the screen with the image content. However, such adjustments have drawbacks. For example, image stretching generally results in image distortion, cropping results in unviewable image content, etc.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
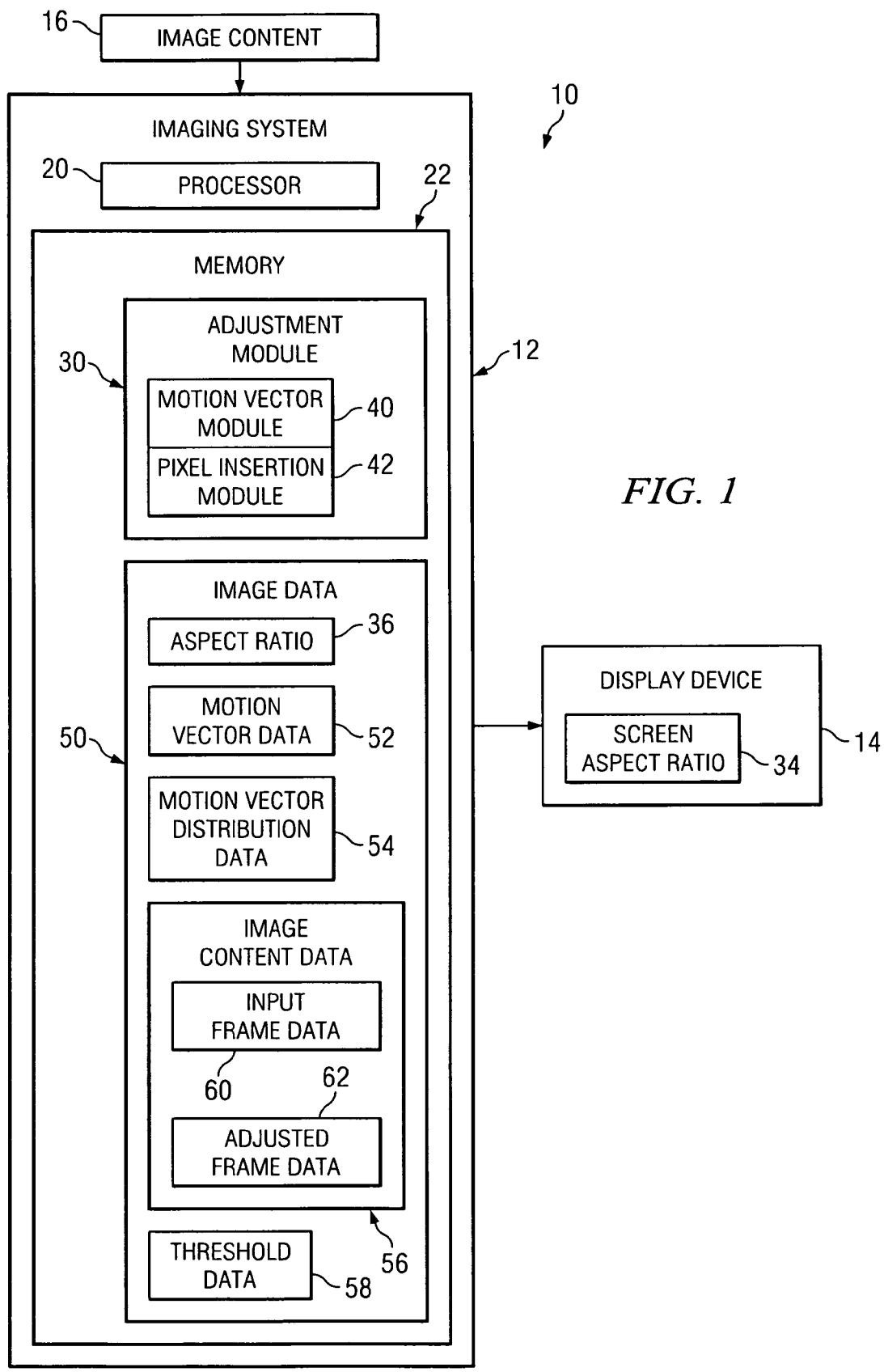
FIG. 1 is a diagram illustrating an embodiment of an image aspect ratio adjustment system in accordance with the present invention.
Figure 2A:
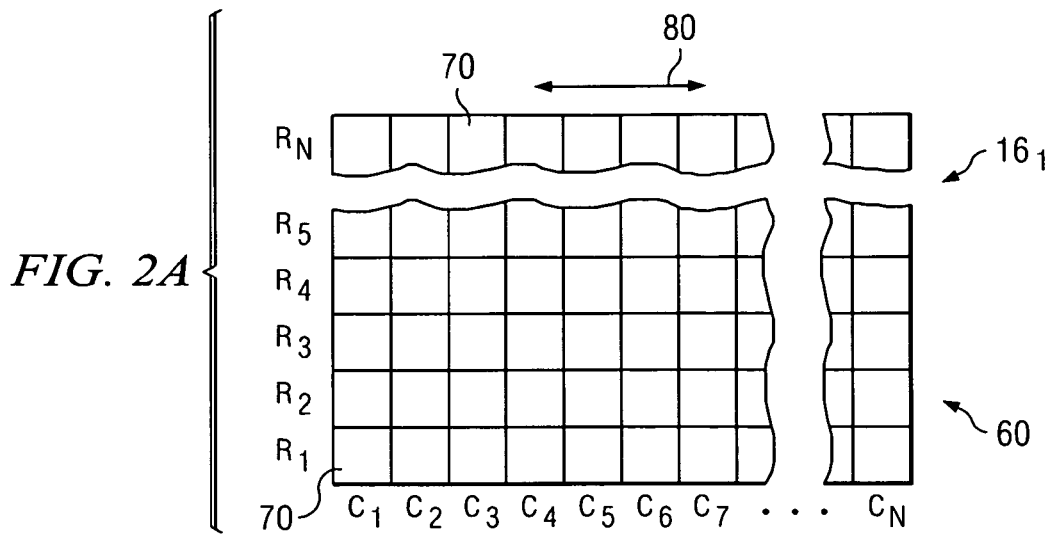
FIGS. 2A-2E are diagrams illustrating an embodiment of an image aspect ratio adjustment method.
Figure 2B:
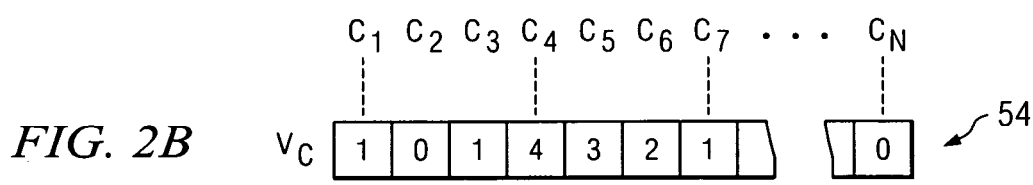
Figure 2C:
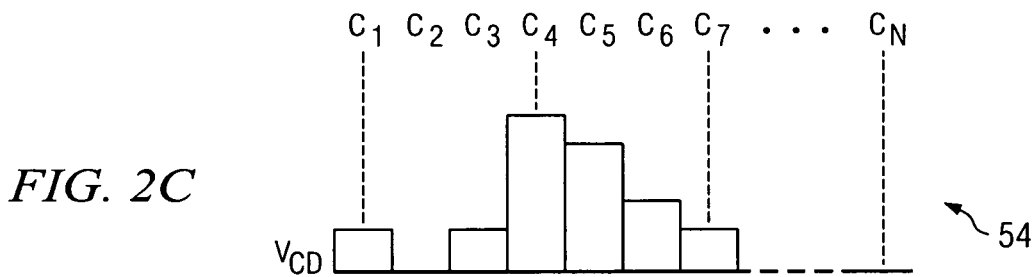
Figure 2D:
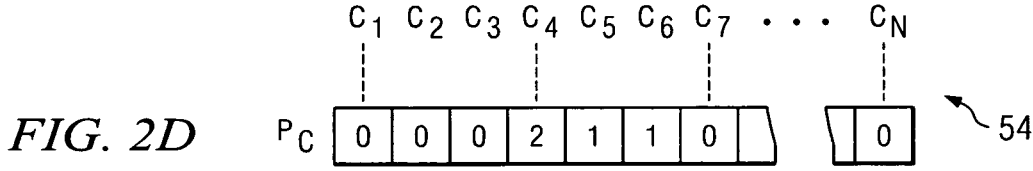
Figure 2E:
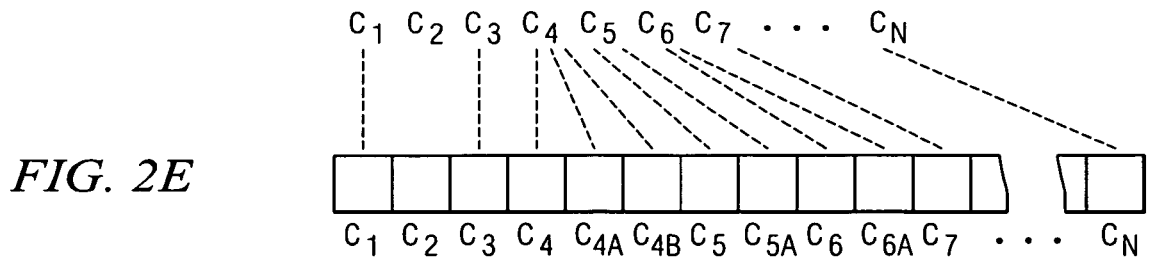
Figure 3:
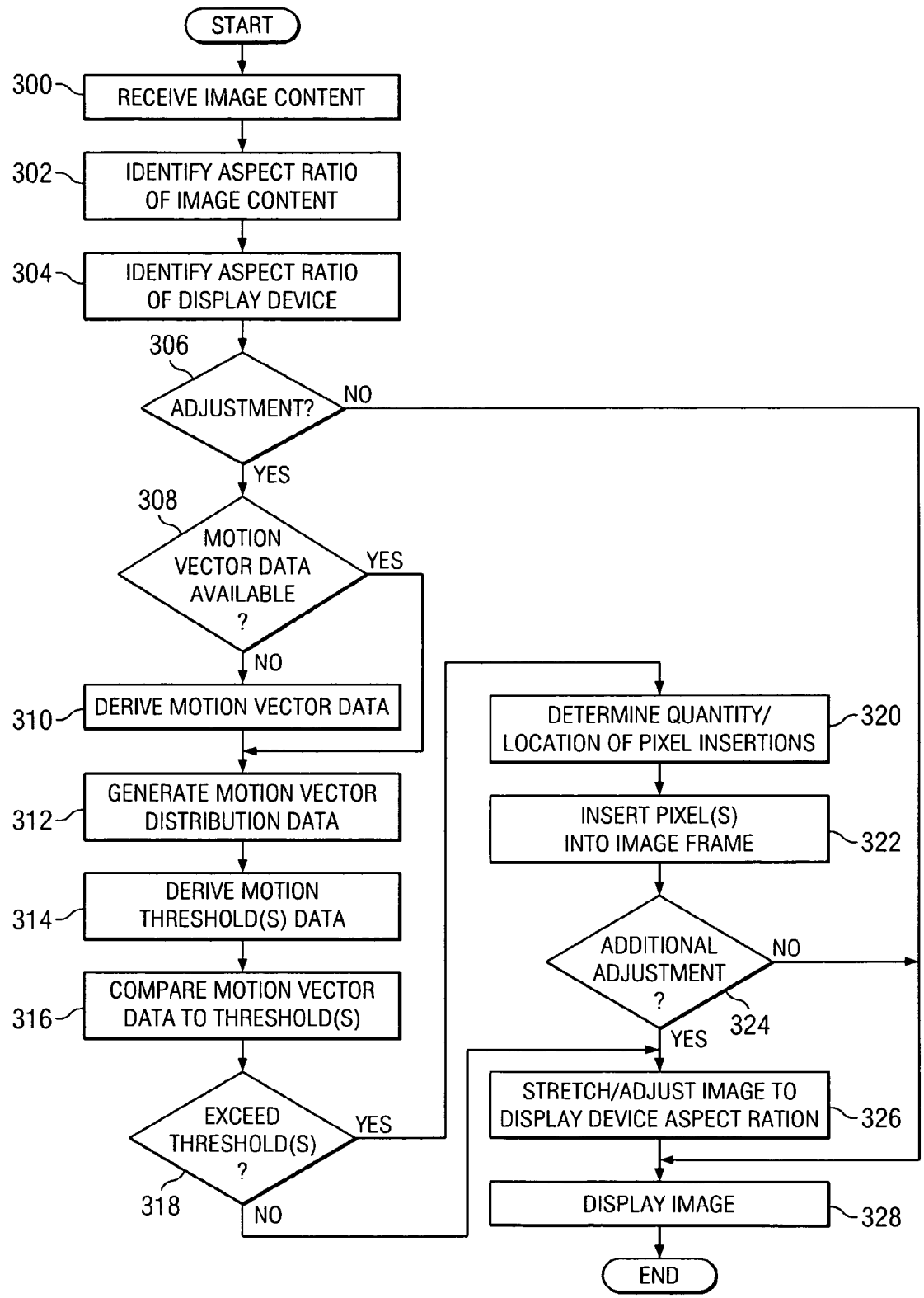
FIG. 3 is a flow diagram illustrating an embodiment of an image aspect ratio adjustment method.

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of an image aspect ratio adjustment system 10. In the embodiment illustrated in FIG. 1, system 10 comprises an imaging system 12 and a display device 14. Imaging system 10 may comprise any type of device for receiving, reading and/or processing image content 16 such as, but not limited to, a digital video disk (DVD) player, television, satellite receiver, computer system, and video recorder. Display device 14 may comprise any type of device for displaying image content 16 such as, but not limited to, a liquid crystal display (LCD), cathode ray tube (CRT), and computer monitor. System 10 may be configured such that imaging system 12 and display device 14 form an integral and/or single unit (e.g., a television). However, it should be understood that, alternatively or additionally, imaging system 12 may be configured to output image content to a remote or separately configured display device 14 (e.g., where display device 14 constitutes a separate and independent device apart from system 12).

In the embodiment illustrated in FIG. 1, imaging system 12 comprises a processor 20 and a memory 22. Imaging system 12 also comprises an adjustment module 30 which may comprise hardware, software, firmware, or a combination thereof. Preferably, adjustment module 30 comprises logic and/or a set of instructions executable by processor 20. In FIG. 1, adjustment module 30 is illustrated as being stored in memory 22 so as to be accessible and executable by processor 20. However, it should be understood that adjustment module 30 may be otherwise stored, even remotely. In operation, adjustment module 30 automatically adjusts and/or stretches image content 16 to correspond to a screen aspect ratio 34 of display device 14. For example, in some applications, it is desired to view image content 16 available and/or otherwise provided in a particular aspect ratio 36 (e.g., a 4:3 aspect ratio) on a display device 14 having a different aspect ratio 34 (e.g., a 16:9 aspect ratio) such that image content 16 is displayed to fill (e.g., fill or substantially fill) the entire visible area of a screen of display device 14.

In the embodiment illustrated in FIG. 1, adjustment module 30 comprises a motion vector module 40 and a pixel insertion module 42. Motion vector module 40 is used to derive and/or analyze motion within image content 16 to determine the modification and/or adjustment to be made to image content 16 for display on display device 14. For example, embodiments of system 10 analyze image content 16 to determine an amount or level of motion within image content 16 to determine where in a particular image frame of image content 16 to adjust the image content 16. Thus, for example, areas or portions of image content 16 exhibiting a particular level(s) of motion are adjusted by inserting additional pixels into image content 16, thereby adjusting the aspect ratio of image content 16 while substantially reducing or eliminating blurring or distortion of image content 16. Pixel insertion module 42 is used to insert one or more pixels into an image frame of image content 16 based on the motion detected within image content 16.

In FIG. 1, memory 22 also aspect ratio 36 indicating the aspect ratio of the provided and/or otherwise received image content 16, and image data 50 having information associated with image content 16 and the analysis and/or adjustment thereof by adjustment module 30. For example, in the embodiment illustrated in FIG. 1, image data 50 comprises motion vector data 52, motion vector distribution data 54, image content data 56, and threshold data 58. Motion vector data 52 comprises information associated with motion vectors detected and/or otherwise derived from image content 16. For example, in some embodiments, image content 16 is provided and/or otherwise received in a digital format (e.g., motion picture experts group (MPEG) format) such that motion vector data 52 is contained in and may be otherwise derived directly from image content 16. In other embodiments, if image content 16 comprises analog content, motion vector module 40 is configured to analyze consecutive frames of the analog image content 16 to determine and/or otherwise derive motion vector information associated with the analog image content 16. The motion vector information associated with image content 16 is derived, detected and/or otherwise stored in memory 22 as motion vector data 52.

Motion vector distribution data 54 comprises information associated with a statistical analysis and/or statistical distribution of motion vector data 52 for the analyzed image content 16. For example, various portions of a frame of image content 16 may exhibit greater amounts of motion (e.g., as indicated by motion vector data 52) than other areas of the same image frame such that a distribution of the motion vector data 52 relative to a length and/or width of the image frame may be derived and/or otherwise determined. Thus, motion vector distribution data 54 comprises information associated with a statistical distribution of motion within image content 16.

Image content data 56 comprises information associated with frames of image content 16 analyzed and/or otherwise received by system 10. For example, in the embodiment illustrated in FIG. 1, image content data 56 comprises input frame data 60 and adjusted frame data 62. Input frame data 60 comprises information associated with frames of image content 16 received and/or otherwise analyzed by adjustment module 30. Input frame data 60 may comprise pixel information associated with a single frame or multiple frames of image content 16. Adjusted frame data 62 comprises information associated with an adjusted or stretched frame of image content 16 generated by adjustment module 30. For example, in some embodiments, adjusted frame data 62 comprises pixel information associated with one or more frames of image content 16 that have been adjusted and/or stretched to accommodate and/or otherwise correspond to aspect ratio 34 of display device 14.

Threshold data 58 comprises information associated with evaluating motion vector data 52 and/or motion vector distribution data 54 of a particular frame of image content 16. For example, in some embodiments, threshold data 58 comprises information against which motion vector data 52 and/or motion vector distribution data 54 is compared to determine whether to insert one or more pixels into a particular image frame of image content 16 based on the motion within the particular image frame and, if so, the location of insertion of the additional pixels. For example, in some embodiments, motion vector data 52 is compared to threshold data 58 to determine whether an amount or level of motion in image content indicates that additional pixels should be inserted into the particular image frame to provide greater image definition in the indicated area (e.g., as opposed to merely stretching present pixels of the image to a larger aspect ratio). Accordingly, different levels of motion within a particular image frame of image content 16 may result in different quantities of pixels inserted into the particular image frame. Thus, it should be understood that threshold data 58 may comprise one or more predetermined threshold levels where each level indicates that a different quantity if pixels be added to the particular frame.

In some embodiments, threshold data 58 is dynamically determined and/or varied based on the amount or level of motion in image content 16. For example, in some embodiments, a statistical analysis of motion vector data 52 and/or motion vector distribution data 56 is performed by motion vector module 40 to determine a relative level of motion in image content 16 and varies the different threshold levels of threshold data 58. Thus, for example, if motion vector distribution data 54 indicates a relatively high level of motion within image content, the threshold levels of threshold data 58 may be adjusted upwardly and/or adjusted to have an increased/decreased range between threshold levels to accommodate greater pixel insertion densities for image content 16. It should also be understood that the levels of threshold data 58 may also be dynamically adjusted to accommodate image content 16 having relatively low levels of motion, and may also be dynamically adjusted on a frame-to-frame basis.

FIGS. 2A-2E are diagrams illustrating an embodiment of an image aspect ratio adjustment method using system 10. Referring to FIG. 2A, input frame data 60 comprises an image content frame $16_1$ illustrated having columns (indicated by $C_1$-$C_N$) and rows (indicated by $R_1$-$R_N$) of pixels 70. In the embodiment illustrated in FIGS. 2A-2E, adjustment of image content 16 is described and illustrated in connection with a horizontal adjustment (indicated by arrow 80) to correspond to a width dimension of aspect ratio 34 of display device 14. However, it should be understood that system 10 may be used to adjust image content frame $16_1$ in a vertical direction either independently or in combination with horizontal adjustment.

Referring to FIG. 2B, motion vector data 52 is determined by motion vector module 40 of adjustment module 30. For example, motion vector module 40 is used to analyze and/or otherwise determine a quantity of motion vectors in image content frame $16_1$. In FIGS. 2A and 2B, motion vector module 40 is used to determine a quantity of motion vectors contained within each column (e.g., columns $C_1$-$C_N$) of image content frame $16_1$. Thus, as an illustrative example, motion vector data 52 is represented in FIG. 2B as $V_C$ where the values of $V_C$ represent a quantity of motion vectors associated with each column (e.g., columns $C_1$-$C_N$) of pixels 70 for image content frame $16_1$. However, it should be understood that image content frame $16_1$ may be otherwise analyzed (e.g., dividing image content frame $16_1$ into a plurality of macroblocks of pixels 70 extending in the direction 80 and determining a quantity of motion vectors for each macroblock of pixels 70). FIG. 2C provides a graphical representation of motion vector distribution data 56 (identified as $V_{CD}$) extending along a horizontal dimension of image content frame $16_1$ corresponding to each column of pixels 70. Thus, as illustrated in FIG. 2C, the quantity of motion vectors corresponding to column $C_4$ indicates a higher level of motion within image content frame $16_1$ at or near column $C_4$ than the level of motion at other columns of pixels 70.

Referring to FIG. 2D, a distribution of pixels to insert into image content frame $16_1$ based on the level of motion in image content frame $16_1$ is illustrated (indicated by $P_C$). For example, in operation, motion vector module 40 compares motion vector data 52 (represented by the $V_C$ values illustrated in FIG. 2B) to threshold data 58 (FIG. 1) to determine a quantity of pixels to insert into image content frame $16_1$. In this example, an entire column of pixels will be inserted into image content frame $16_1$ to uniformly adjust and/or increase the horizontal dimension of image content frame $16_1$ in the direction indicated by arrow 80 (FIG. 2A). In operation, threshold data 58 is used to determine a quantity of pixels 70 (e.g., a quantity of columns of pixels 70) to insert into image content frame $16_1$ based on motion vector data 52. For example, referring to FIGS. 2B-2D, as the level of motion within a particular column of pixels 70 increases, pixel insertion module 42 inserts a greater quantity of columns of pixels 70 into image content frame $16_1$ at or near the increased area of motion. Thus, for example, in the embodiment illustrated in FIGS. 2B-2D, if a quantity of motion vectors detected in a particular column of pixel 70 is less than or equal to one, no columns of pixels are inserted. If the quantity of motion vectors for a particular column of pixels 70 is less than four but greater than or equal to two, a single column of pixels 70 will be inserted into image content frame $16_1$ at or near the particular columns. If the quantity of motion vectors for a particular column of pixels 70 is greater than four, two columns of pixels 70 will be inserted into image content frame $16_1$ at or near the particular column. Thus, in operation, as a level of motion increases within a particular frame of image content 16, additional pixels are inserted into image content frame $16_1$ to provide more detail within image frame $16_1$ in the particular area or location of image frame $16_1$.

Thus, referring to FIG. 2E, at columns $C_1$-$C_3$, no columns of pixels 70 are inserted into image content frame $16_1$. However, at column $C_4$, because of a higher level of motion detected within image content frame $16_1$ corresponding to pixel column $C_4$, two additional columns of pixels 70 are inserted at or near column $C_4$ (the inserted columns of pixels 70 indicated by $C_{4A}$ and $C_{4B}$). Accordingly, at the locations indicated by columns $C_5$ and column $C_6$, a single column of pixels 70 is inserted into image content frame $16_1$ at or near respective columns $C_5$ and column $C_6$ (the inserted columns of pixels respectively identified as $C_{5A}$ and $C_{6A}$).

In the illustrative example described in connection with FIGS. 2A-2E, motion vector data 52 (e.g., the quantities of motion vectors represented by $V_C$) was compared against fixed and/or predetermined levels or thresholds of threshold data 58 to determine whether to insert an additional column (s) of pixels 70 into image content frame 16$_1$. However, it should be understood that the levels of threshold data 58 against which motion vector data 52 is compared may be dynamically determined. For example, the levels of threshold data 58 may be dynamically adjusted based on a level of motion within a particular frame of image content 16 (e.g., within a particular row of column of pixels 70, the distribution across a horizontal or vertical dimension of image content 16, or between different frame of image content 16).

In operation, the inserted pixels within image content frame 16$_1$ may be color-designated using a variety of techniques. For example, the color or mapping of the inserted pixels may be provided to match an adjacent pixel and/or interpolated between pixels adjacent each side of the inserted pixel to provide a smooth, filtered transition, thereby also providing increased detail during image generation and creating a higher frequency component into image content frame 16$_1$. After insertion of additional pixels 70 into image content frame 16$_1$, a determination is made whether the adjusted image frame (e.g., represented by adjusted frame data 62 in FIG. 1) corresponds to aspect ratio 34. For example, the additional columns of pixels 70 added to image content frame 16$_1$ may result in the adjusted image frame corresponding to aspect ratio 34. However, if the adjusted image frame does not yet correspond to aspect ratio 34, the adjusted image frame may be further adjusted (e.g., image scaling or using a panoramic stretch process) such that the adjusted image frame is extended to correspond to aspect ratio 34.

FIG. 3 is a flow diagram illustrating an embodiment of an image aspect ratio adjustment method. The method begins at block 300, where system 10 receives image content 16. At block 302, adjustment module 30 determines and/or otherwise identifies aspect ratio 36 of image content 16. At block 304, adjustment module 30 identifies and/or otherwise determines aspect ratio 34 of display device 14. At decisional block 306, a determination is made whether to adjust image content 16 to correspond to aspect ratio 34. For example, if aspect ratio 34 matches aspect ratio 36, or if a user desires not to adjust image content 16 to aspect ratio 34, no further action by adjustment module 30 may be needed, and the method proceeds to block 328, where image content 16 is displayed on display device 14. At decisional block 306, if an adjustment is desired, the method proceeds to decisional block 308, where a determination is made whether motion vector data 52 is available for image content 16. For example, if image content 16 is provided and/or otherwise received in a digital format, motion vector data 52 may be obtained and/or otherwise derived from the digital information and, if so, the method proceeds to block 312. If image content 16 is not in a digital format and/or motion vector data 52 is not otherwise available, the method proceeds to block 310, where motion vector module 40 derives motion vector data 52 for the frames of image content 16.

At block 312, motion vector module 40 generates motion vector distribution data 54 based on the derived motion vector data 52 for a particular frame of image content 16. At block 314, adjustment module 30 retrieves and/or derives threshold data 58 for comparison to motion vector data 52. At block 316, adjustment module 30 compares motion vector data 52 to threshold data 58.

At decisional block 318, a determination is made whether motion vector data 52 indicates that motion vectors corresponding to image content 16 exceeds one or more levels of threshold data 58. If the motion vector data 52 does not exceed one or more levels of threshold data 58, the method proceeds to block 326, where image content 16 is scaled and/or stretched to aspect ratio 34 of display device 14 (e.g., using image scaling or a panoramic stretch process). If at decisional block 318 it is determined that motion vector distribution data 54 exceeds one or more levels of threshold data 58, the method proceeds to block 320, where pixel insertion module 42 determines a quantity and/or location for insertion of additional pixels into image content 16. At block 322, pixel insertion module 42 inserts additional pixels into image content frame 16$_1$ based on a level of motion within various portions of image content frame 16$_1$. At decisional block 324, a determination is made whether an additional adjustment to image content frame 16$_1$ is necessary to correspond to aspect ratio 34 of display device 14. For example, after additional pixels are inserted into image content frame 16$_1$, the adjusted image content frame 16$_1$ may now correspond to aspect ratio 34. However, if additional adjustment of the adjusted image content frame 16$_1$ is needed to correspond to aspect ratio 34 of display device 14, the method proceeds to block 326, where adjustment module 30 further adjusts the particular image frame to correspond to aspect ratio 34. At decisional block 324, if it is determined that no further adjustment to image content frame 16$_1$ is necessary, the method proceeds to block 328, where the adjusted image content frame 16$_1$ is displayed on display device 14.

Thus, embodiments of system 10 provide a content-based system and method to determine which portion of image content to adjust to correspond to a desired aspect ration. For example, embodiments of system 10 analyze the amount of motion within the image content and, based on areas of the image content exhibiting increased motion, insert additional pixels into the image content locally in the areas of increased motion, thereby reducing or substantially eliminating distortion of the image content, especially near the edge of the image content. It should be understood that in the described methods, certain functions may be omitted, accomplished in a sequence different from that depicted in FIGS. 2A-2E and 3, or simultaneously performed. Also, it should be understood that the methods depicted in FIGS. 2A-2E and 3 may be altered to encompass any of the other features or aspects as described elsewhere in the specification. Further, embodiments may be implemented in software and can be adapted to run on different platforms and operating systems. In particular, functions implemented by adjustment module 30, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semi-conductor system, apparatus, device, or propagation medium.

What is claimed is:

1. An image aspect ratio adjustment system, comprising:
an adjustment module configured to:
determine a row of a frame of image content where the amount of motion exceeds a threshold;

determine a number of rows of pixels to add to the frame based on the amount of motion of the determined row; and add the determined number of rows of pixels to the frame adjacent to the determined row to cause the image content to correspond to an aspect ratio of a display device.

2. The system of claim 1, wherein the threshold is dynamically determined based at least in part on a level of motion within the image content.

3. The system of claim wherein the adjustment module is configured to derive a motion vector distribution associated with the image content.

4. The system of claim 1, wherein the adjustment module is configured to determine a number of rows of pixels to add to the frame based at least in part on a motion vector distribution associated with the image content.

5. An image aspect ratio adjustment method, comprising:
determining a column of image content where the amount of motion exceeds a threshold;
determining a number of columns of pixels to add to the image content based on the amount of motion of the determined column; and
adding the determined number of columns of pixels to the image content adjacent to the determined column to correspond to an aspect ratio of a display device.

6. The method of claim 5, further comprising dynamically determining the threshold.

7. The method of claim 6, further comprising basing the dynamically determined threshold at least in part on a level of motion within the image content.

8. The method of claim 5, further comprising deriving a motion vector distribution associated with the image content.

9. The method of claim 5, further comprising determining the amount of motion of the determined column based at least in part on a motion vector distribution associated with the image content.

10. An image aspect ratio adjustment system, comprising:
means for determining whether image content has a particular aspect ratio;
means for comparing the amount of motion of portions of image content to levels of motion to determine a level of motion associated with each of the portions if determined that the image content does not have a particular aspect ratio, wherein the portions comprise at least one of rows or columns of pixels of the image content;
means for determining a number of pixels to add to each of the portions based on the determined levels of motion; and
means for adding the determined number of pixels adjacent to the associated portions.

11. The system of claim 10, further comprising:
means for determining the aspect ratio of the image content with the added number of pixels; and
means for stretching the image content when the determined aspect ratio does not correspond to the particular aspect ratio.

12. The system of claim 10, further comprising means for determining the level of motion of the portions of the image content based on a motion vector distribution associated with the image content.

13. The system of claim 10, wherein the portions comprise rows of pixels and wherein determining a number of pixels to add comprises determining a number of rows of pixels to add.

14. The system of claim 10, wherein the portions comprise columns of pixels and wherein determining a number of pixels to add comprises determining a number of columns of pixels to add.

15. A computer-readable non-transitory medium having stored thereon an instruction set to be executed by a processor, comprising instructions to:
adjust image content to correspond to an aspect ratio of a display device, including:
determining areas of image content with a level of motion above a threshold;
increasing the number of at least one of columns or rows of pixels in the determined areas of image content, wherein the number of at least one of columns or rows of pixels added is based on the level of motion of the areas of image content.

16. The computer-readable non-transitory medium of claim 15, further comprising instructions to: determine the areas of the image content with motion above a threshold based on a motion vector distribution associated with the image content.

17. The computer-readable non-transitory medium of claim 15, further comprising instructions to dynamically determine the threshold.

18. The computer-readable non-transitory medium of claim 17, wherein the dynamically determined threshold comprises a threshold determined based on the level of motion within the image content.

19. The computer-readable non-transitory medium of claim 15, wherein determining areas of image content with motion above the threshold comprises determining rows or columns of pixels within the image content with motion above the threshold.

20. The computer-readable non-transitory medium of claim 15, further comprising determining multiple thresholds of motion.

* * * * *

UNITED STATES PATENT AND TRADEMARK OFFICE
CERTIFICATE OF CORRECTION

| | | |
|---|---|---|
| PATENT NO. | : 8,068,172 B2 | Page 1 of 1 |
| APPLICATION NO. | : 11/644393 | |
| DATED | : November 29, 2011 | |
| INVENTOR(S) | : Leonard Tsai | |

It is certified that error appears in the above-identified patent and that said Letters Patent is hereby corrected as shown below:

In column 7, line 11, in Claim 3, delete "claim" and insert -- claim 1, --, therefor.

Signed and Sealed this
Twenty-third Day of October, 2012

David J. Kappos
*Director of the United States Patent and Trademark Office*